US 7,415,908 B2

(12) United States Patent
Zernickel et al.

(10) Patent No.: US 7,415,908 B2
(45) Date of Patent: Aug. 26, 2008

(54) CLAMPING DEVICE FOR A STEERING COLUMN

(75) Inventors: Alexander Zernickel, Herzogenaurach (DE); Thomas Dirnberger, Obermichelbach (DE); Harald Hochmuth, Hagenbuechach (DE); Guido Grimsmann, Bad Bramstedt (DE); Hans Kluemper, Vögelsen (DE); Rainer Wilken, Alveslohe (DE); Carsten Sass, Hamburg (DE); Holger Kittler, Hamburg (DE)

(73) Assignee: Ina-Schaeffler KG, Herzogenaurach (DE)

( * ) Notice: Subject to any disclaimer, the term of this patent is extended or adjusted under 35 U.S.C. 154(b) by 242 days.

(21) Appl. No.: 10/544,269

(22) PCT Filed: Feb. 4, 2004

(86) PCT No.: PCT/EP2004/001023

§ 371 (c)(1),
(2), (4) Date: Feb. 28, 2006

(87) PCT Pub. No.: WO2004/069629

PCT Pub. Date: Aug. 19, 2004

(65) Prior Publication Data

US 2006/0213309 A1     Sep. 28, 2006

(30) Foreign Application Priority Data

Feb. 5, 2003   (DE)   ................. 103 04 640

(51) Int. Cl.
*B62D 1/18* (2006.01)

(52) U.S. Cl. ........................ 74/493; 280/775

(58) Field of Classification Search ............ 74/473.31, 74/492, 493; 280/775
See application file for complete search history.

(56) References Cited

U.S. PATENT DOCUMENTS

| 5,088,767 | A | * | 2/1992 | Hoblingre et al. | ............ 280/775 |
| 5,213,003 | A | * | 5/1993 | Speich | ........................ 74/493 |
| 5,213,004 | A | * | 5/1993 | Hoblingre | ..................... 74/493 |
| 5,377,555 | A | * | 1/1995 | Hancock | ...................... 74/493 |
| 5,392,667 | A | | 2/1995 | Courvoisier | |
| 5,394,767 | A | * | 3/1995 | Hoblingre et al. | ............. 74/493 |
| 5,481,938 | A | * | 1/1996 | Stuedemann et al. | .......... 74/493 |
| 5,524,927 | A | * | 6/1996 | Toussaint | .................... 280/777 |
| 5,655,413 | A | * | 8/1997 | Barton | ........................ 74/493 |
| 5,921,577 | A | * | 7/1999 | Weiss et al. | ................. 280/775 |
| 6,450,531 | B1 | * | 9/2002 | Rinker et al. | ................ 280/775 |

(Continued)

FOREIGN PATENT DOCUMENTS

EP          0600700 A        6/1994

*Primary Examiner*—Richard Ridley
*Assistant Examiner*—Matthew Johnson
(74) *Attorney, Agent, or Firm*—Fay Kaplun & Marcin, LLP (57) ABSTRACT

A clamping device includes a first clamping plate and a second clamping plate, the first clamping plate being rotatable between a released position and a clamped position in relation to the second clamping plate. The clamping device further includes a rolling body which establishes contact between the first and second clamping plates. The second clamping plate includes a clamping ramp with a contour for the rolling body so that when the clamping plates are rotated in relation to each other, the space between the clamping plates changes. The first clamping plate has a surface which forms a plane on which the rolling body rolls from the released position to the clamped position.

6 Claims, 4 Drawing Sheets

U.S. PATENT DOCUMENTS

| | | | |
|---|---|---|---|
| 7,010,996 B2 * | 3/2006 | Schick et al. | 74/492 |
| 7,028,579 B2 * | 4/2006 | Irish et al. | 74/493 |
| 2002/0083784 A1 * | 7/2002 | Brauer et al. | 74/57 |
| 2002/0178857 A1 * | 12/2002 | Matsumiya | 74/493 |

* cited by examiner fig. 1

CLAMPING DEVICE FOR A STEERING COLUMN

FIELD OF THE INVENTION

The present invention relates to a clamping device for fixing the position of a vehicle steering column which is adjustable in length and/or inclination, in particular a motor vehicle steering column.

TECHNOLOGICAL FIELD

Steering column position adjusting devices with which the inclination as well as the length of the steering column can be adjusted, i.e. the position of the steering wheel in relation to the operator is adjustable, are used to improve driving comfort and achieve individual adaptation of the steering wheel position to the requirements of the driver of the vehicle.

Furthermore, steering column position adjusting devices are known with which height adjustment of the steering column is achievable so that it becomes possible for vehicle drivers of different build to optimally adjust the steering wheel to suit their needs and the particular driving situation. These clamping devices not only improve the comfort but also the safety during operation of the vehicle, and are thus a safety-relevant device in a motor vehicle.

Steering column position adjusting devices are known which comprise a bracket that is fixed to the vehicle and that has supporting arms, between which the steering column is arranged. Between or on these supporting arms, clamping devices are provided for locking the position of the steering column. Such clamping devices interact with the supporting arms such that the clamping device in one clamped position approaches the supporting arms so that the position of the steering column is fixed between the supporting arms, and when the clamping device is in a released position, the length and/or inclination of the steering column is adjustable between the supporting arms.

U.S. Pat. No. 5,394,767 shows such a clamping device in which the distance between a first disc and a second disc is changed in that when there is rotation of the first disc relative to the second disc, balls are rolled up a ramp in a first direction, which ramp is provided on the second disc, and consequently the space between the first disc and the second disc is increased. If the first disc is rotated in relation to the second disc in a second direction opposite the first direction, the balls are rolled down the ramp of the second disc, as a result of which the space between the two discs decreases. When such a clamping device is attached to a tie bolt which connects two supporting arms, between which the longitudinal column is arranged, clamping of the steering column becomes possible by rotating the first disc relative to the second disc in the first direction. Undoing the grip on the steering column for adjusting said steering column is possible by rotating the first disc relative to the second disc in the second direction. The clamping device disclosed in U.S. Pat. No. 5,394,767 is associated with a disadvantage in that due to the very considerable clamping forces required the first and the second disc necessarily have to be made of metal, and the first and the second disc are complex and expensive to produce since each disc has to comprise recesses which match the balls, for the purpose of guiding the balls. Therefore, the clamping device disclosed in U.S. Pat. No. 5,394,767 is expensive to produce and moreover very heavy, due to the necessary use of metal as a material for the discs.

US 2002/0083784 A1 discloses a clamping device with two discs in which, opposite each other, ball ramps for accommodating balls situated between the discs are provided. When the two discs are rotated in relation to each other, the balls roll along the defined ball ramps, as a result of which the distance between the discs is changed. As is the case in the device disclosed in U.S. Pat. No. 5,394,767, the clamping device disclosed in US 2002/0083784 A1 is also associated with a disadvantage in that due to the very considerable clamping forces needed for clamping a steering column the two discs have to be made of metal. Since in the device according to US 2002/0083784 A1 ball ramps have to be provided in each disc, which ball ramps are complicated to produce, this device too is associated with very considerable production costs. Furthermore, this device too, due to the use of metal discs which also for the purpose of incorporating the ramps have to have a certain thickness, is very heavy.

SUMMARY OF THE INVENTION

A clamping device according to an exemplary embodiment of the present invention comprises a first clamping plate element and a second clamping plate element with a guide element positioned in between, which guide element comprises a hole in which there is a rolling body which contacts the first clamping plate element and the second clamping plate element. The second clamping plate element comprises a clamping ramp for the rolling body, wherein the clamping ramp comprises a contour on which the rolling body rolls when the second clamping plate element is rotated between a released position and a clamped position in relation to the first clamping plate element. The contour changes from the released position to the clamped position such that when the two clamping plate elements are rotated in relation to each other, between the released position and the clamped position, a space between the first and the second clamping plate element is changed. Advantageously, the surface of the first clamping plate element forms a plane on which the rolling body rolls during rotation from the released position to the clamped position.

Since the first clamping plate element does not have any shaped parts for the rolling body, and can thus for example be formed by a simple punching procedure from a standard metal sheet, it is particularly simple and economical to produce. The clamping device according to an exemplary embodiment of the present invention only comprises one clamping disc in which shaped parts for the rolling body are to be provided. Consequently, the production costs are considerably reduced. Moreover, since no recess for accommodating the rolling body is provided in the first clamping plate, the thickness of the first clamping plate can be minimised, as a result of which the weight of the clamping device according to the present invention is minimised. Moreover, the clamping device according to the present invention comprises only few components and is thus cost-effective to produce and easy to install.

According to another exemplary embodiment of the present invention, the guide element comprises a control contour for a microswitch. In this way, a position or movement of the guide element can be recorded in a simple way, and for example a warning signal can be transmitted to the driver of the motor vehicle if the clamping device is not completely closed when the vehicle is started.

According to a further exemplary embodiment of the present invention, on the second clamping plate element a lever adapter with a T-shaped cross section for sliding on a correspondingly formed section of an activation lever is provided. Thus the interface between the lever adapter and the activation lever is advantageously designed so as to be of modular construction so that different activation levers can be slid on, depending on the requirements. Furthermore, according to this exemplary embodiment, the T-shaped cross section may be designed such that between the activation lever and the lever adapter only an axial force up to a particular threshold value that can be specified by designing the T-shaped cross section is possible, and if an axial force is applied that exceeds the threshold value, the activation lever is decoupled from the T-shaped cross section of the lever adapter. In this way, in the case of an accident or crash, the activation lever is advantageously decoupled from the lever adapter so that improved safety for the driver of the motor vehicle is provided.

According to a further exemplary embodiment of the present invention, a clamping device is stated in which the guide element comprises a locking spring, and the activation lever comprises a locking stud, wherein the locking spring and the locking stud limit rotation of the guide element and of the lever adapter to a region between the released position and the clamped position. Furthermore, the locking spring and the locking stud may be designed such that by their interaction they prevent snapping open in the clamped position, and undesired closing in the released position. Advantageously, in this way safe operation of the clamping device is ensured and thus operational safety is enhanced.

According to a further exemplary embodiment of the present invention, the lever adapter is connected to the second clamping plate element, having positive fit, and the first clamping plate element is connected to the guide element, having positive fit. Advantageously, connection, with positive fit, between the first clamping plate element and the guide element establishes a firm seat of the guide element on the first clamping plate element. Moreover, the guide element is stabilised and thus strengthened by the close connection to the clamping plate element. Furthermore, the positive-fit connections between the lever adapter and the second clamping plate element, as well as between the guide element and the first clamping plate element, make possible an axially low installation of the clamping device, although the clamping device provides a large axial stroke. A space-saving clamping device of low design is provided in this way. The connections having positive fit can for example in a simple way be implemented by means of a positioning carrier of the guide element for engaging a corresponding recess in the first clamping plate, and by means of a driver cam on the lever adapter for engaging in a corresponding recess in the second clamping element.

According to another exemplary embodiment of the present invention, the first and the second clamping plate element are made from metal while the guide element and the lever adapter are made from plastic, for example by means of injection moulding. With this design, for example the control contour of the guide element, the locking spring and the locking stud can be made without large expenditure, so as to be very light in weight. Furthermore, this way of production is particularly cost-effective. Thus, according to the present invention, difficult-to-form contours of the clamping device, e.g. the control contour for the microswitch, the locking spring and the locking stud, are made from plastic and can be produced economically and precisely so as to be light in weight. In contrast to this, the metal components, namely the first and the second clamping plate, are designed so as to be as simple as possible. In particular the first clamping plate can thus for example be a simple disc punched from sheet metal. Since according to the present invention the guide element only assumes lateral guidance of the rolling body, but essentially does not bear any axial forces, the guide plate can be made of a plastic material without this resulting in weakening the clamping device. Furthermore, according to this advantageous embodiment of the present invention, the clamping device will be subjected to little wear since the rolling body is guided in the sturdy metal clamping plate elements. This advantageously also makes it possible for the clamping device according to the present invention to be able to withstand or generate very considerable clamping forces.

According to a further exemplary embodiment of the present invention, the rolling body is a ball and the clamping ramp is a spherical cap with a ramp geometry which causes a change in distance between the first and the second clamping plate element when the first and second clamping plate element are rotated between the clamped position and the released position. Advantageously, the design of the present invention makes possible operation of the clamping device without any jamming.

According to a further exemplary embodiment of the present invention, the clamping device further comprises a tie bolt, arranged at a right angle in relation to the steering column, wherein the steering column is guided between a first supporting arm and a second supporting arm of a fixed bracket. The tie bolt extends between the first and the second supporting arms, with the first end of the tie bolt being held by the first supporting arm. On the second end of the tie bolt, the second clamping plate element is affixed such that it is fixed, i.e. non-slidable, in axial direction of the tie bolt. The first clamping plate element is arranged between the second clamping plate element and the second supporting arm such that the steering column is firmly held between the first and the second supporting arms if the first and the second clamping plate elements are rotated such that they are in the clamped position, and the length and/or position of the steering column between the first supporting arm and the second supporting arm are/is adjustable if the first and the second clamping plate elements are rotated such that they are in the released position. In this way a position adjustment device for a steering column is stated which with relatively simple means makes it possible to clamp and release the length adjustment and height adjustment of a steering column, which position adjustment device comprises fewer components and is lighter in weight while still being able to withstand very considerable clamping forces so that safe clamping of the steering column is ensured. The clamping device can for example be prefabricated as a unit and can be supplied in a preassembled state to motor vehicle manufacturers.

BRIEF DESCRIPTION OF THE DRAWINGS

Below, the present invention is explained in more detail with reference to the embodiments shown in the figures.

DETAILED DESCRIPTION OF THE EXEMPLARY EMBODIMENTS

Figure 1:
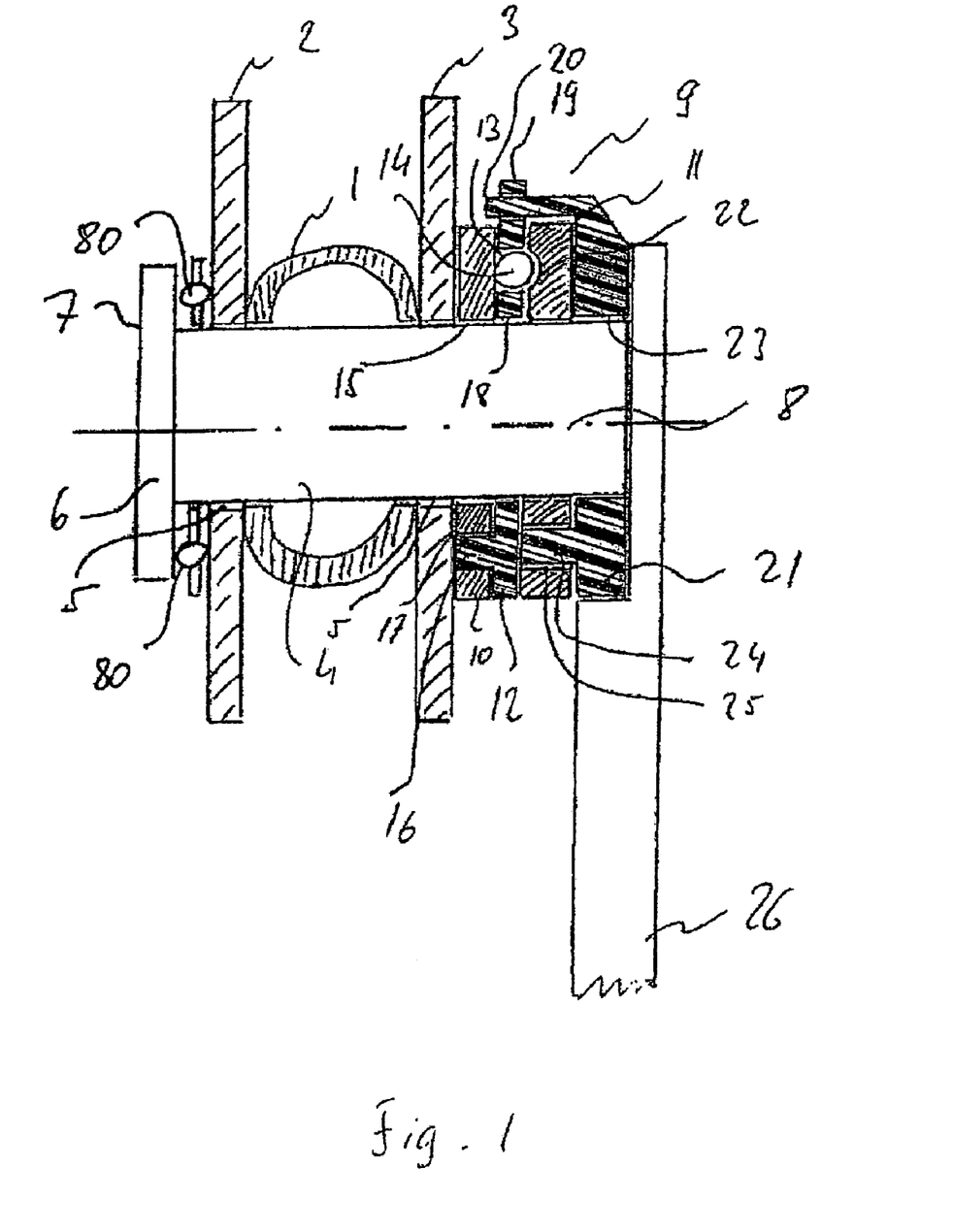
FIG. 1 shows a diagrammatic longitudinal section of one embodiment of a position adjusting device for a steering column according to an exemplary embodiment of the present invention with an embodiment of a clamping device according to the present invention.

FIG. 1 shows a position adjusting device for a steering column 1, in particular of a motor vehicle, which position adjusting device is arranged between a first supporting arm 2 and a second supporting arm 3. The supporting arms 2 and 3 form part of a fixed bracket (not shown in FIG. 1) in the region of the instrument panel of a motor vehicle. A tie bolt 4 is provided between the first supporting arm 2 and the second supporting arm 3, which tie bolt 4 is arranged at a right angle in relation to the steering column 1. Preferably the tie bolt 4 is a cylindrical bolt. The tie bolt 4 leads through apertures 5 in the first and second supporting arms 2, 3. For the purpose of attaching the tie bolt 4, on one end 6 of the tie bolt a region 7 is provided where the diameter is larger than the diameter of the aperture or borehole 5 in the supporting arm 2. Through the region with larger diameter 7, the tie bolt 4 is held in axial direction, in FIG. 4 towards the right, to the first supporting arm 2. Between the region 7 of the tie bolt and the first supporting arm 2, a thrust bearing 80 is provided. Arranged on the second end 8 of the tie bolt 4 is a clamping device 9 according to one embodiment of the present invention. The clamping device 9 comprises a lamellar sheet metal disc 10 as well as a clamping disc 11 made of metal. The clamping disc 11 is attached to the second end 8 of the tie bolt such that said clamping disc 11 in axial direction is firmly, i.e. non-slidably, attached to the tie bolt 4. For example, the clamping disc 11 is attached to the tie bolt 4 with a press fit. However, it is also possible for the clamping disc 11 to be welded to the tie bolt 4, for example by means of friction welding. A guide disc 12 is provided between the lamellar sheet metal disc 10 and the clamping disc 11. The guide disc 12 comprises a hole 13 in which a rolling body is arranged. The guide disc 12 can be designed such that it guides the rolling body in a direction which is perpendicular to the axial direction of the tie bolt 4. In the embodiment shown in FIG. 1 a ball 14 is provided as a rolling body, which ball 14 contacts the lamellar sheet metal disc 10 and the clamping disc 11. Due to the sectional plane of the diagram, only one ball 14 is shown in FIG. 1. However, advantageously, a multitude of balls 14 are provided as rolling bodies in the clamping device 9 according to the present invention.

As shown in FIG. 1, the ball 14 is supported by the flat surface of the lamellar sheet metal disc 10. Preferably, the lamellar sheet metal disc 10 does not comprise any recesses or shaped parts for guiding the ball 14. In the embodiment shown in FIG. 1, the lamellar sheet metal disc 10 is a flat disc, which has for example been punched out from a piece of sheet metal and is thus very easy to produce.

The lamellar sheet metal disc 10 comprises a borehole 15 with a diameter which is larger than the external diameter of the tie bolt 14 so that the lamellar sheet metal disc 10 is slidable axially in relation to the tie bolt 4, on the tie bolt 4, and is arranged so as to be rotatable, in relation to the clamping disc 11, on the tie bolt 4.

The guide disc 12 comprises a positioning carrier 16, which engages a corresponding opposite recess 17 of the lamellar sheet metal disc so as to form a positive-fit connection between the lamellar sheet metal disc 10 and the guide disc 12. Like the lamellar sheet metal disc 10, the guide disc 12 comprises a borehole 18 for inserting the tie bolt 4, wherein the diameter of the borehole 18 is larger than the external diameter of the tie bolt 4. Consequently, the guide disc 12, together with the lamellar sheet metal disc 10, is slidable on the tie bolt 4 in axial direction of said tie bolt 4 and is rotatable. Furthermore, the guide disc 12 comprises a locking spring 19 which interacts with a locking stud 20 on a lever adapter 21 such that the locking spring and the locking stud limit rotation of the guide element and of the lever adapter to a region between the released position, in which the distance between the lamellar sheet metal disc 10 and the clamping disc 11 is minimal, and the clamped position, in which the distance between the lamellar sheet metal disc 10 and the clamping disc 11 is maximal; thus preventing undesired snapping open of the clamping device 9 in the clamped position, and undesired closing in the open position. The interaction between the locking stud 20 and the locking spring is described in detail with reference to FIGS. 2 and 3.

FIG. 1 shows that the clamping disc 11 comprises a recess 22 for accommodating the ball 14. The recess 22 is designed such that it forms a clamping ramp with a contour, wherein when the clamping disc 11 is rotated in relation to the lamellar sheet metal disc 10, the ball 14 rolls between the released position and the clamped position. In this arrangement, the contour from the released position to the clamped position changes such that when the lamellar sheet metal disc 10 is rotated in relation to the clamping disc 11 between the released position and the clamped position, the distance between the lamellar sheet metal disc 10 and the clamping disc 11 is changed. Preferably, the recess 22 has the contour of a spherical cap.

The lever adapter 21 is provided on the clamping disc 11. The lever adapter 21 preferably comprises a borehole 23 with a diameter which exceeds the external diameter of the tie bolt 4 so that the lever adapter 21 can simply be slid onto the tie bolt 4. The lever adapter 21 comprises a driver knob 24 which, for the purpose of establishing a positive-fit connection between the lever adapter 21 and the clamping disc 11, engages a recess 25 of the clamping disc 11.

On the lever adapter 21 an activation lever 26 is provided. Preferably, to this effect the lever adapter 21 has a T-shaped cross section (not shown in FIG. 1) for sliding a correspondingly formed section of the activation lever 26 on. In this arrangement the respectively formed section of the activation lever 26 and the T-shaped cross section of the lever adapter 21 are designed such that the activation lever 26 is decoupled from the T-shaped cross section of the lever adapter 21 if an axial force is transferred that exceeds a threshold value. This is particularly advantageous in an accident situation since injury to the driver by the activation lever 26 can be prevented. This is described in more detail with reference to FIGS. 2, 3 and 4.

The clamping device 9 according to the invention thus essentially comprises two individual components, namely a first component which comprises the lamellar sheet metal disc 10 with the guide disc 12 that is connected therewith so as to have positive fit, as well as a second part which comprises the clamping disc 11 with the lever adapter 21 being connected so as to have positive fit. The balls 14 are provided between the first part and the second part. Preferably, as already described above, both parts comprise a metal component that has been formed to be as simple as possible, which metal component absorbs the axial forces that occur during clamping, and a plastic component which carries out control functions, such as for example limitation of rotation of the two components in relation to each other. In this arrangement it poses no problem if the plastic components, namely the guide disc 12 and the lever adapter, are of a complex shape, since these components are for example simply and cost-effectively producible by means of an injection moulding method. Furthermore, the combination of metal discs 10 and 11, with plastic elements 12 and 21, results in the weight of the clamping device 9 being minimal. Moreover, the clamping device 9 shown in FIG. 1 is essentially not subject to wear because the substantial forces, namely the axial clamping force, are absorbed by the lamellar sheet metal disc 10 and the metal clamping disc 11, whereas the plastic elements 12 and 21 are not subjected to the clamping force directed axially in relation to the tie bolt 4. Furthermore, the clamping device 9 shown in FIG. 1 is not subject to settling behaviour, because there is no plastic in the flux of force line.

In the following description of the function of the position adjusting device, shown in FIG. 1, for a steering column with the clamping device 9 it is assumed that FIG. 1 shows the clamping device 9 in a position between the released position and the clamped position. If as a result of activation of the activation lever 26 the clamping disc 11 is rotated relative to the lamellar sheet metal discs 10, in the direction of the clamped position, the ball 14 on the contour of the clamping disc 11 rolls in the direction of the clamped position, as a result of which the lamellar sheet metal disc 10 and the guide disc 12 are axially slid along the tie bolt 4 in the direction of the supporting arm 3. As a result of this, the supporting arms 2 and 3 are slid towards each other so that the steering column 1 is jammed between the supporting arms 2 and 3.

If the activation lever 26 is rotated in the direction of the released position, the clamping disc 11 is rotated by way of the lever adapter 21 in relation to the lamellar sheet metal disc 10. In this way, the ball 14 on the contour of the recess 22 of the clamping disc 11 rolls in the direction of the released position, as a result of which the distance between the clamping disc 11 and the lamellar sheet metal disc 10 is reduced. In this process the lamellar sheet metal disc 10 and the guide disc 11, 12 are displaced onto the tie bolt 4 in axial direction away from the steering column 1. As a result of this, the bracing action of the two supporting arms 2 and 3 to the steering column ceases so that the length or inclination of the steering column 1 can be adjusted.

Figure 2:
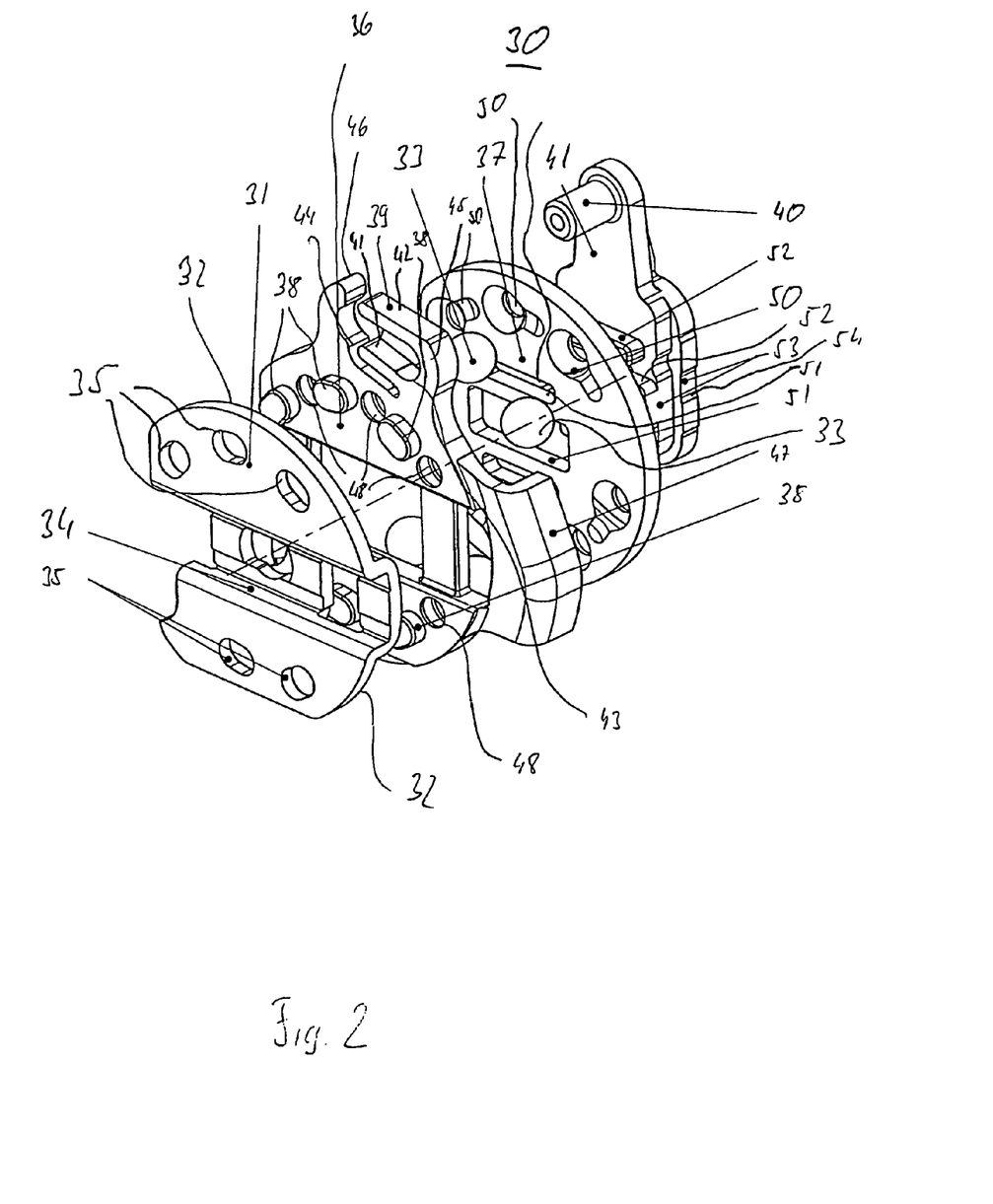
FIG. 2 shows a three-dimensional view of a further exemplary embodiment of a clamping device according to the present invention.

FIG. 2 is a three-dimensional illustration of an embodiment of a clamping device 30 according to the present invention. The clamping device 30 shown in FIG. 2 can be arranged in the same manner as the clamping device 9 of FIG. 1 in the position adjusting device for a steering column 1, which position adjusting device is shown in FIG. 1. The clamping device 30 of FIG. 2 comprises a lamellar sheet metal disc 31. The lamellar sheet metal disc 31 comprises flat sections 32 (in FIG. 2 on the far side of the lamellar sheet metal disc 31) by which the balls 33 of the clamping device 30 are supported. Furthermore, the lamellar sheet metal disc 31 comprises a contour 34 for accommodating a lamellar disc of the steering column for attachment to a spring lamella of the steering column (not shown in FIG. 2). In the flat sections 32 of the lamellar sheet metal disc 31, recesses 35 are provided. The lamellar sheet metal disc 31 is made from metal and can be produced simply and cost-effectively, for example by means of a punching procedure in which the external contour and the recesses 35 are punched out, and a stamping procedure in which the contour 34 is formed.

The clamping device 30 further comprises a guide disc 36. As shown in FIG. 2, the guide disc 36 is provided between the lamellar sheet metal disc 31 and a clamping disc 37. The guide disc 36 comprises a multitude of positioning carriers 38 which interact with the recesses 35 on the lamellar sheet metal disc 31. The positioning carriers 38 and the recesses 35 are designed such that when the guide disc 36 and the lamellar sheet metal disc 31 are joined the positioning carriers 38 interact with the recesses 35 of the lamellar sheet metal disc 31 to form a positive-fit connection between the lamellar sheet metal disc 31 and the guide disc 36.

Furthermore, the guide disc 36 comprises a locking spring 39 for interaction with a locking stud 40 on a lever adapter 41 As shown in FIG. 2, the locking spring 39 comprises a lower spring tab 41, an upper spring tab 42, a clamped-position locking depression 44, a released-position locking depression 43, a clamped-position end stop 46 and a released-position end stop 45.

Furthermore, the guide disc 36 comprises a control contour 47 which can for example be picked up by means of a microswitch. In the device 30 shown in FIG. 2, the control contour 47 is arranged on a region of the guide disc 36, which region is angled in relation to the guide disc 36. This angled section reaches past the clamping disc 37. In this way it is possible, with the smallest possible axial extension of the clamping device 30, to form the widest possible control contour 47 for being picked up by means of a microswitch (not shown).

Furthermore, the guide disc 36 comprises holes 48. The diameter of the holes 48 is such that in the assembled arrangement the balls 33 while being guided in the holes 48 do not however transmit any axial force onto the guide disc 36. Accordingly, the diameter of the holes 48 is preferably such that the balls 33 have little play in the holes 48 when the balls 33 contact the surface of the regions 32 of the lamellar sheet metal disc 31.

The guide disc 36 is made from a plastic material, for example polyethylene. Preferably, the guide disc 36 is made by means of an injection moulding process.

The clamping disc 37 is disc-shaped like the lamellar sheet metal disc 31. To accommodate the balls 33, which are preferably made of metal, the clamping disc 11 comprises a number of recesses 50 that corresponds to the number of balls 33. Each of the recesses 50 forms a clamping ramp with a contour. On these contours the balls 33 roll between the released position and the clamped position. The contours are of such a shape that when the lamellar sheet metal disc 31 is rotated in relation to the clamping disc 37, between the released position and the clamped position, the balls 33 roll from the low positions of the contours to the high positions of the contours. As a result of this, the distance between the lamellar sheet metal disc 31 and the clamping disc 37 is changed. The recesses 50 in the clamping disc 37, which recesses 50 are shown in FIG. 2, are in the shape of spherical caps. Apart from the recesses 50, the clamping disc 37 comprises recesses 51.

The clamping disc 37 may be made from metal. For example the recesses 50 can be milled.

The lever adapter 41 of FIG. 2 comprises a locking stud 40 for interacting with the locking spring 39 on the guide disc 36. Driver knobs 52 are provided on the lever adapter 41, which driver knobs 52, when the lever adapter 41 is connected to the clamping disc 37, together with the recesses 51 of the clamping disc 37 form a positive-fit connection between the lever adapter 41 and the clamping disc 37. As shown in FIG. 2, the lever adapter 41 comprises a receiver contour 53 for an activation lever (not shown in FIG. 2). The receiver contour 53 comprises a T-shaped cross section, onto which a correspondingly shaped section of the activation lever can be slid. Moreover, the receiver contour 53 comprises a locking indentation 54, by means of which the activation lever can be fixed on the T-shaped cross section of the receiver contour 53.

The lever adapter 41 may be made from plastic, for example polyethylene. For example, the lever adapter 41 can be produced economically by means of an injection moulding process.

Figure 3:
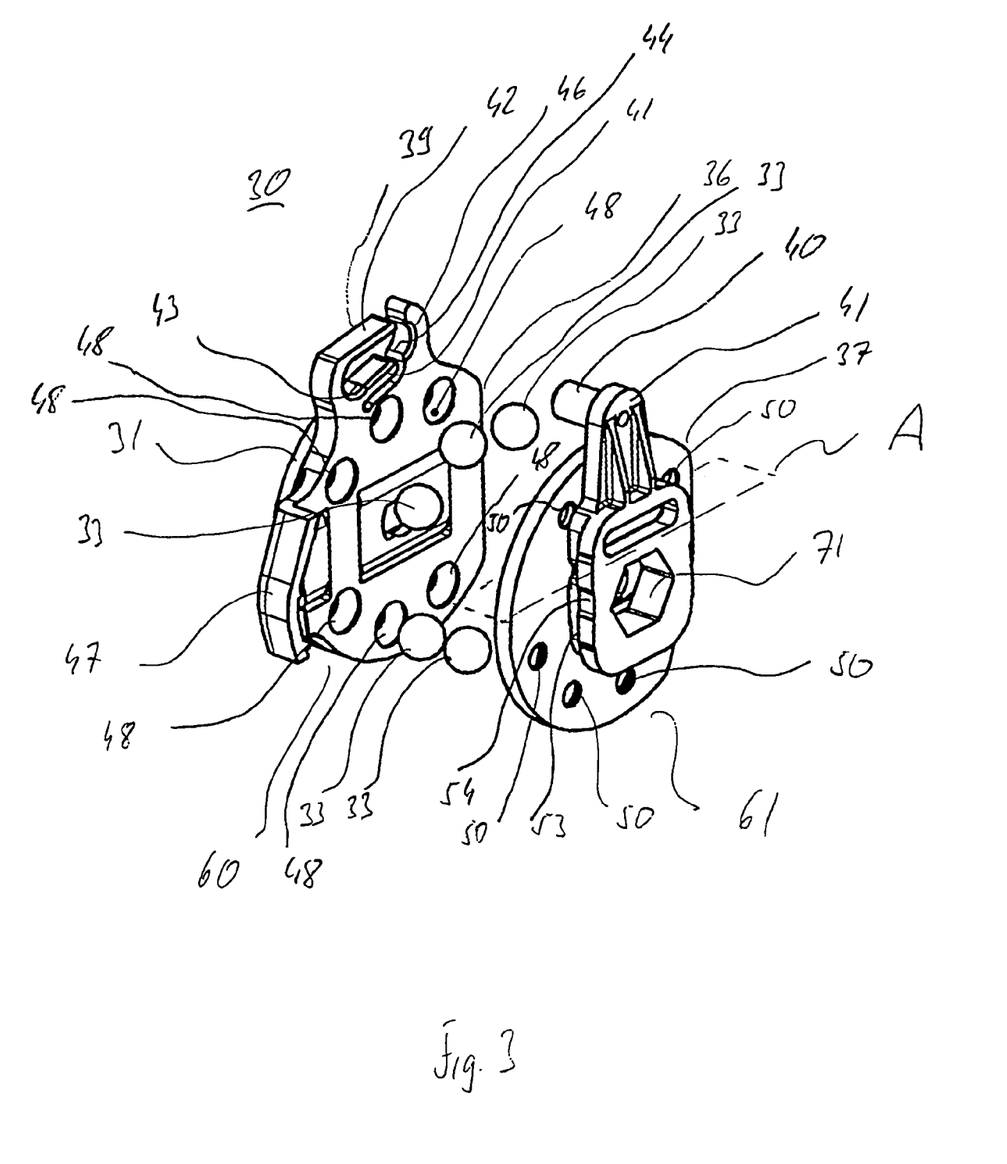
FIG. 3 shows a further three-dimensional view of the clamping device of FIG. 2.

FIG. 3 shows a three-dimensional view of the clamping device 30 of FIG. 2 in a view that differs from that in FIG. 2, wherein for the purpose of forming the lamellar sheet metal disc 31 and the guide disc 36 a first bearing side 60 are connected having positive fit, and for the purpose of forming a second bearing side 61 the lever adapter 41 is connected with positive fit to the clamping disc 37. As shown in FIG. 3, the recesses 48 can comprise a contour for guiding the balls 33, wherein the contour of the recesses 48 is such that the balls 33 roll on the flat regions 32 of the lamellar sheet metal disc 31. As has been stated before with reference to FIGS. 1 and 2, the lamellar sheet metal disc 31 according to the present invention does not have any indentation, recess or formed shape to guide the balls 33 but only a level surface by which the balls 33 are supported.

The lever adapter 41, which is connected to the clamping disc 37, in the region of the receiver contour 53 for the activation lever (not shown) comprises the locking indentation 54 into which a corresponding shaped part on the activation lever (not shown) can snap. In this way a snap connection between the activation levers and the lever adapter 41 is provided. The design and function of the receiver contour 53 of the lever adapter 41 is further described with reference to FIG. 4.

FIG. 3 in particular shows that as a result of the positive-fit connection between the lamellar sheet metal disc 31 and the guide disc 36 on the one hand, and between the lever adapter 41 and the clamping disc 37 on the other hand, a first and a second bearing side 60, 61 are formed, between which the balls 33 are arranged. The first and second bearing sides 60, 61 each comprises two materials, namely metal and plastic. The metal elements of the first and second bearing side 60, 61, namely the lamellar sheet metal disc 31 and the clamping disc 37, are provided for carrying the balls 36 and essentially absorb the entire axial forces of the clamping device 30. All other functions, such as for example the provision of a guide contour 47, the limitation of rotation of the first bearing side 60 in relation to the second bearing side 61 by the clamped-position end stop 46 and the released position end stop 45 in conjunction with the locking stud 40 and the temporary fixation of the released position as a result of the locking stud 40 snapping into the released-position locking depression 43 on the guide disc 36, as well as the snapping of the locking stud 40 into the clamped-position locking depression 44 so as to prevent closing in the released position or opening in the clamped position, are handled by those elements of the first bearing side 60 and the second bearing side 61, which elements are made from plastic, namely by the guide disc 36 and the lever adapter 41. Furthermore, the lever adapter 41 carries out the function of accommodating the activation lever and of safety-relevant decoupling of the activation lever from the clamping device 30, for example in an accident.

Accordingly, the clamping device 30 of the present invention is almost non-wearing and can be exposed to very considerable clamping forces because the function of carrying the balls 33 is handled by the metal elements, wherein, due to the fact that all further functions are handled by the plastic elements, said metal elements can be designed in a very simple manner and are therefore economical to produce. Thus, by means of the plastic elements, namely the guide disc 36 and the lever adapter 41, it is thus possible to provide simple elements that are economical to produce, which elements handle all the functions of the clamping device 30 except the function of holding the balls 33.

Below, one functional embodiment of the clamping device 30 described with reference to FIGS. 2 and 3 is described. In the assembled state of the clamping device 30, the locking stud 40 of the lever adapter 41 engages an aperture between the lower spring tab 41 and the upper spring tab 42 of the locking spring 39. When the clamping device 30 is in the clamped position the locking stud 40 rests against the clamped-position end stop 46 and rests in the clamped-position locking depression 44. The situation where the locking stud 40 rests in the clamped-position locking depression 44 between the clamped-position end stop 46 and the lower spring tab 41 on the one hand prevents further rotation of the clamping device 30 in the direction of the clamped position, and on the other hand prevents the clamping device 30 from snapping out of the clamped position.

If the lamellar sheet metal disc 31 with the guide disc 36 is rotated against the clamping disc 37 with the lever adapter 41, first an increased resistance has to be overcome to move the locking stud 40 out of the clamped-position locking depression 44 against the resistance of the lower spring tab 41 and the upper spring tab 42. In this process in FIG. 2 the lower spring tab 41 is pushed downward and the upper spring tab 42 is pushed upwards. Subsequently, the first bearing side 60 is rotated in relation to the second bearing side 61 in the direction of the released position, wherein the balls 33 roll in the nests (recesses 48) on the flat sections 32 of the lamellar sheet metal disc 31. During rotation from the clamped position to the released position the balls 33 roll in the clamping disc 37 along the contours of the recesses 50, as a result of which the distance between the clamping disc 37 and the lamellar sheet metal disc 31 is reduced. In this process, the locking stud 40 between the upper spring tab 42 and the lower spring tab 41 is displaced to the released position end stop 45. Preferably, the ramps in the recesses 50 are designed such that the balls 33 reach the lowest point in the contours of the recesses 50 when the locking stud 40 rests against the released position end stop 45. Then the distance between the lamellar sheet metal disc 31 and the clamping disc 37 is minimal. In the released position, the locking stud 40 is accommodated in the released-position locking depression 43. In order to rotate the clamping device 30 back from the released position to the clamped position, the locking stud 40 must be moved out of the released-position locking depression 43 against the resistance of the lower spring tab 42 and the upper spring tab 41. This ensures that the clamping device 30, when it is in the released position, cannot of its own accord snap closed, i.e. cannot automatically, and in a way that is not intended, rotate to the clamped position.

Figure 4:
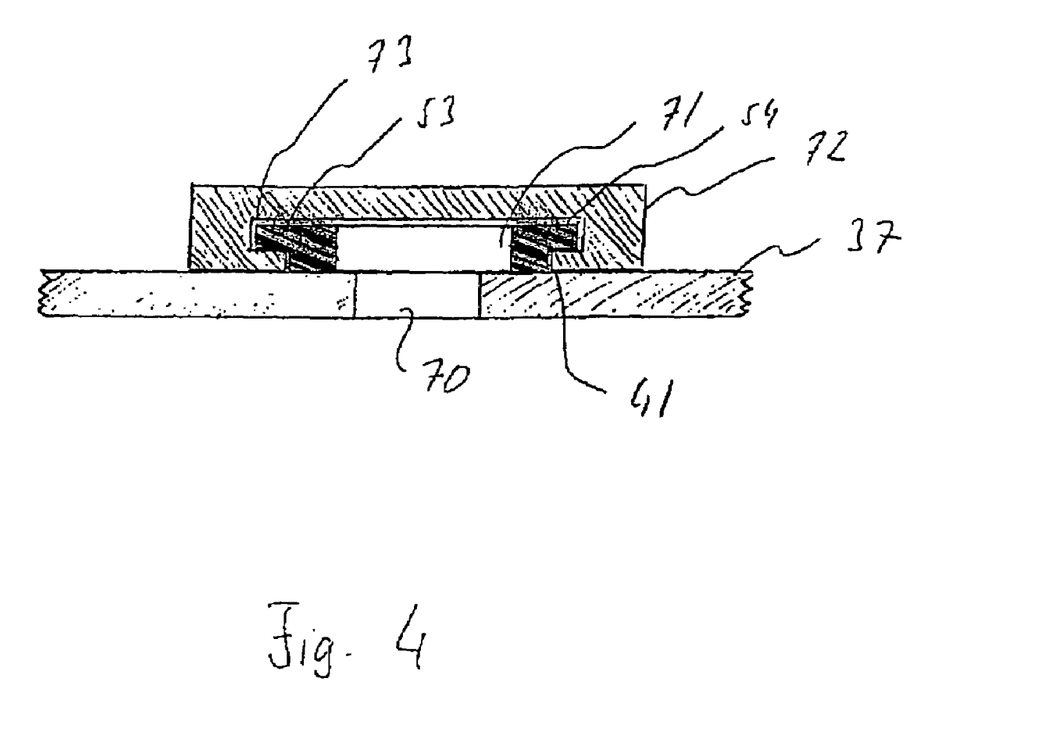
FIG. 4 shows a section of a clamping disc and a lever adapter along plane A in FIG. 3.

FIG. 4 shows a cross section of a region of the second bearing side 61, along plane A in FIG. 3. The second bearing side 61 comprises the clamping disc 37 and the lever adapter 41 connected thereto having positive fit, wherein an activation lever 72 is slid onto the T-shaped receiver contour 53 of the lever adapter 41. Recesses 71 and 70 are provided in the lever adapter 41 and in the clamping disc 37.

In a region which is to be slid onto the lever adapter 41, the activation lever 72 is of a cross section which interacts with the T-shaped cross section of the lever adapter 41. In the present embodiment, this section of the activation lever 72 has a T-shaped recess which corresponds to the T-shaped cross section of the lever adapter 41 so that the activation lever 72 can be slid with positive fit onto the lever adapter 41. As already described with reference to FIG. 3, the receiver contour 53 of the lever adapter 41 comprises a narrowing or indentation 54 to engage a corresponding contour on the activation lever 72, as a result of which the activation lever 72 is secured against being pulled off from the lever adapter 41 in that the contour snaps into the indentation 54 on the lever adapter 41.

The T-shaped cross section of the lever adapter 41, which cross section forms the receiver contour 53, is designed such that if an axial force which exceeds a threshold value is transmitted from the activation lever 72 to the lever adapter 41, the activation lever 72 is decoupled from the T-shaped cross section of the lever adapter 41. Advantageously this reduces the risk of injury to the driver in the case of an accident. The threshold value above which the activation lever 72 is decoupled can for example be set by selecting the material of the lever adapter 41 and/or of the activation lever 42, or by changing the size of the T-shaped cross section of the lever adapter 41. This threshold value can also be set by changing the width or the length of a region above which the lever adapter 41 and the activation lever 42 are engaged.

It should be noted that the term "comprising" does not exclude other elements or steps and the "a" or "an" does not exclude a plurality. Also elements described in association with different embodiments may be combined.

The invention claimed is:

1. A clamping device for fixing a position of a vehicle steering column which is adjustable in at least one of length and inclination, comprising:
a first clamping plate element and a second clamping plate element with a rolling body positioned in between,
wherein the rolling body is accommodated in a hole in a guide element which is arranged between the first clamping plate element and the second clamping plate element,
wherein the second clamping plate element is rotatable between a released position and a clamped position in relation to the first clamping plate element,
wherein the second clam in late element comprises a clamping ramp for the rolling body,
wherein a surface of the first clamping plate element forms a plane, and the rolling body on the first clamping plate element rolls from the released position to the clamped position on the plane of the surface,
wherein the clamping ramp comprises a contour on which the rolling body rolls when the second clamping plate element is rotated between the released position and the clamped position in relation to the first clamping plate element,
wherein the contour changes from the released position to the clamped position such that when the second clamping plate element is rotated between the released position and the clamped position in relation to the first clamping plate element a space between the first and the second clamping plate element is changed,
wherein on the second clamping plate element a lever adapter with a T-shaped cross section for sliding on a correspondingly formed section of an activation lever is provided,
wherein the correspondingly formed section of the activation lever and the T-shaped cross section are designed such that if an axial force is applied that exceeds a threshold value, the activation lever is decoupled from the T-shaped cross section of the lever adapter,
wherein the guide element comprises a locking spring, and the lever adapter comprises a locking stud, and
wherein the locking spring and the locking stud limit rotation of the guide element and the lever adapter to a region between the released position and the clamped position, and prevent unintended snapping open of the clamping device in the clamped position, and unintended closing in the released position.

2. The clamping device of claim 1, wherein the guide element comprises a control contour for a microswitch.

3. The clamping device of claim 1,
wherein the first and the second clamping plate elements are made from metal while the guide element and the lever adaptor are made from plastic.

4. The clamping device of claim 1,
wherein the rolling body is a ball and the clamping ramp is a spherical cap with a ramp geometry which causes a change in distance between the first and the second clamping plate element when the first and second clamping plate element are rotated between the clamped position and the released position.

5. The clamping device of claim 1, further comprising:
a tie bolt, arranged at a right angle in relation to the steering column;
wherein the steering column is guided between a first supporting arm and a second supporting arm of a fixed bracket;
wherein the tie bolt extends between the first and the second supporting arms, with the first end of the tie bolt being held by the first supporting arm;
wherein on the second end of the tie bolt, the second clamping plate element is affixed such that it is fixed in an axial direction of the tie bolt;
wherein the first clamping plate element is arranged between the second clamping plate element and the second supporting arm such that the steering column is firmly held between the first and the second supporting arms if the first and the second clamping plate elements are rotated such that they are in the clamped position, and at least one of the length and position of the steering column between the first supporting arm and the second supporting arm is adjustable if the first and the second clamping plate elements are rotated such that they are in the released position.

6. A clamping device for fixing a position of a vehicle steering column which is adjustable in at least one of length and inclination, comprising:
a first clamping plate element and a second clamping plate element with a rolling body positioned in between,
wherein the rolling body is accommodated in a hole in a guide element which is arranged between the first clamping plate element and the second clamping plate element,
wherein the second clamping plate element is rotatable between a released position and a clamped position in relation to the first clamping plate element,
wherein the second clamping plate element comprises a clamping ramp for the rolling body.
wherein a surface of the first clamping plate element forms a plane, and the rolling body on the first clamping plate element rolls from the released position to the clamped position on the plane of the surface,
wherein the clamping ramp comprises a contour on which the rolling body rolls when the second clamping plate element is rotated between the released position and the clamped position in relation to the first clamping plate element,
wherein the contour changes from the released position to the clamped position such that when the second clamping plate element is rotated between the released position and the clamped position in relation to the first clamping plate element a space between the first and the second clamping plate element is changed,
wherein the lever adapter is connected to the second clamping plate element, having positive fit, and the first clamping plate element is connected to the guide element, having positive fit, and
wherein on the guide element a positioning carrier is provided that engages corresponding recess in the first clamping plate element to establish a connection having positive fit between the first clamping plate element and the guide element, and wherein, on the lever adapter, a driver cam for engagement in a corresponding recess is provided in the second clamping plate element so as to form a connection having positive fit between the lever adapter and the second clamping plate element.

* * * * *